May 5, 1964     S. F. RUSSO     3,132,289

MANUAL BY-PASS FOR METER SOCKET AND THE LIKE

Filed April 3, 1962

Inventor,
Salvatore F. Russo,
by Francis K. Doyle
His Attorney

United States Patent Office 3,132,289
Patented May 5, 1964

3,132,289
MANUAL BY-PASS FOR METER SOCKET AND THE LIKE
Salvatore F. Russo, Rochester, N.Y., assignor to General Electric Company, a corporation of New York
Filed Apr. 3, 1962, Ser. No. 184,710
3 Claims. (Cl. 317—108)

This invention relates to meter sockets and the like, and more particularly, to a manual by-pass for use in meter sockets to prevent interruption of service due to the removal of meters which are placed in such meter sockets.

In today's electrical industry, various meters, for example watthour meters, are installed in meter sockets and the like to provide registration and recordation of the uses of electrical energy. These meters are used extensively in industrial plants, various commercial establishments, such as stores, repair shops and the like and in residences. These meters, in general, have a very long life averaging at least thirty years. During this period of time it becomes necessary to periodically remove the meters for cleaning and testing, and on occasion, for repair. Of course, it also becomes necessary after a period of years to replace various of these meters, either because the life of the meter has expired or to upgrade the electrical service being provided to a particular customer. When these meters are removed from the sockets for any reason, the electrical service provided to the customer must necessarily be interrupted temporarily unless means are provided to temporarily make a connection between the line leads and the load leads when the electric meter has been removed.

Various means of providing these temporary connections between the line leads and the load leads of a meter socket are known, and in general, they are classified in the art as either an automatic by-pass or a manual by-pass. In an automatic by-pass, a connection is automatically made between the line leads and the load leads of a meter socket upon the removal of the meter from its socket. In the manual by-pass, the connection between the line leads and the load leads must be made manually before the meter is removed from its socket in order to prevent any interruption of service.

Since in general, the removal of the meters from their sockets is only done on very infrequent occasions, the cost of a by-pass device must be very small in order that a utility company can justify its use in a normal installation. It will, of course, be understood, that in those installations where even a short interruption of service would cause a distinct loss or a hazard to the customer, the utilities would install a by-pass device regardless of cost. Since the majority of installations are such that a temporary interruption of service would not cause substantial loss or great inconvenience to the customer, a by-pass of low cost is necessary to eliminate the annoyance caused by such interruptions. In order to provide for a wide-spread use of low cost by-pass devices, it will be understood that the by-pass must necessarily be simple in operation, very efficient, and capable of installation either in the field on present day sockets or in the factory on new meter sockets. In general, a manual by-pass will best fill these needs.

Further, it will be apparent that during normal meter inspection it is impossible to ascertain ahead of time whether any meters will in fact need to be removed from their meter sockets. Of course, it is also possible that a number of meters may well have to be removed for any one of a number of reasons. Obviously, it is desirable that the meter by-pass be a self-contained unit mounted within the meter socket to prevent the necessity of carrying any special tools, jumpers or the like, during the various inspection trips.

Further, it will be apparent that since a manual by-pass is connected or operated in the meter socket prior to the removal of the meter from its socket the manual by-pass must be of the type which will be readily noticeable when in its closed position. Further, it must be one which would be almost impossible to leave in the closed position in the meter socket after the meter had been returned or replaced in its socket. The loss which the utilities would sustain if a manual by-pass were inadvertently left in the closed position over a long period of time will appear obvious. Therefore, it is also necessary that the manual by-pass be one which will provide a positive indication that the meter is by-passed and which will advantageously prevent the meter cover from being replaced while the meter is in a by-pass condition.

It is, therefore, one object of this invention to provide a manual by-pass which is low in cost, electrically safe in operation, and which may be readily operated in the meter sockets.

It is a further object of this invention to provide a manual by-pass for meter sockets which will provide a positive indication that the meter of the meter socket has been by-passed.

It is a further object of this invention to provide a manual by-pass for meter sockets which is simple in operation, and which may be readily installed in meter sockets either in the field or in the factory.

A still further object of this invention is to provide a meter by-pass for a meter socket that is self-contained within the socket and which does not require special tools or the like for its operation.

In carrying out this invention in one form thereof, a manual by-pass for a meter socket is provided in the form of a shorting link between the line terminal and the load terminal of the meter socket. The shorting link is made of a conductive material and is electrically connected to one of the terminals of the meter socket. The shorting link is also provided with a mechanical connection to the other terminal in the meter socket. The mechanical connection is manually movable into two positions, in one position the shorting link is in electrical contact with the other terminal, while in the other position the shorting link is out of electrical contact with the other terminal. Therefore, by means of placing the manual connecting means in one position the shorting link is electrically connected between the terminals and the meter is by-passed, while in the other position of the manual connecting means the shorting link is electrically disconnected from one terminal and the meter is not by-passed.

The invention which is sought to be protected will be particularly pointed out and distinctly claimed in the claims which are appended hereto. However, it is believed that the manner in which the various objects and advantages of this invention are obtained, as well as other objects and advantages thereof, will be more readily understood from the following detailed description of a preferred embodiment of this invention when taken in connection with the accompanying drawing, in which:

Figure 1:
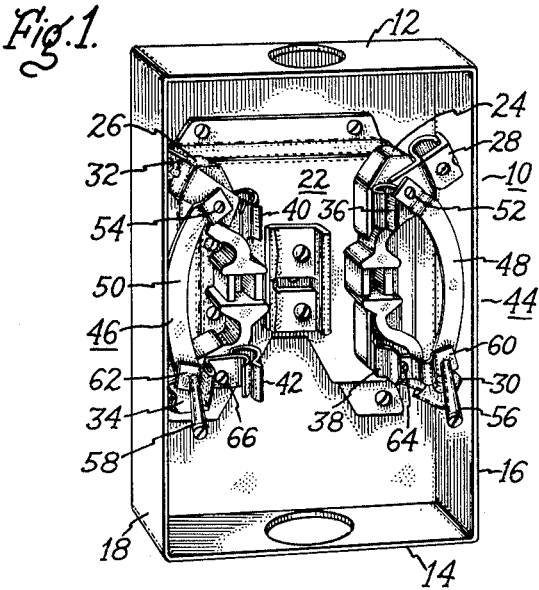
FIGURE 1 is a perspective view of one type of meter socket showing a preferred embodiment of the manual by-pass of this invention mounted therein.

Referring now to the drawing in which like numerals are used to indicate like parts throughout the various views thereof, this invention is shown in a preferred form as a self-contained manual by-pass mounted in a meter socket. Considering first FIGS. 1 and 2 of the drawing, the invention is shown in conjunction with a meter socket 10. It will be understood that meter socket 10 can be of any desired shape, for example a round socket. However, in the preferred embodiment it is shown as a rectangular socket. Meter socket 10 is preferably of the "ringless" type, that is, the socket is one in which the meter is placed in the socket before the cover of the socket is placed thereon. However, it should be understood that the manual by-pass of this invention could also be used with other types of socket, if desired. As shown, particularly in FIG. 1, the meter socket 10 comprises a side wall and back wall, shown as top and bottom walls 12 and 14, respectively, side walls 16 and 18, and back wall 20. Mounted on the back wall 20 is a mounting plate, or the like, designated 22, on which is secured a pair of terminal blocks 24 and 26. Of course, it will be understood that the terminal blocks 24 and 26 could be mounted directly on the back wall 20, should this be desired. As shown, each terminal block is provided with a line terminal and a load terminal. The line terminal on block 24 being indicated at 28, while the load terminal is indicated at 30. In a similar manner, the line terminal for block 26 is indicated at 32, while the load terminal is indicated at 34. In the normal manner, jaw connectors are provided, each of which is connected to one of the line terminals and the load terminals, the jaw terminals being indicated at 36, 38, 40, and 42, respectively. Each of the jaw members is utilized to make contact with the blade terminal of a meter (not shown) which is inserted in the socket. It will be understood that when a meter is inserted in the socket that the line terminals 28 and 32 are connected to the load terminals 30 and 34 through the jaw terminals 36, 38, 40, and 42, respectively, by means of the meter mounted therein. However, in order to provide a manual by-pass of the meter socket when the meter has been removed, that is, in order to connect each of the line terminals 28, 32 with their respective load terminals 30, 34, it is desirable to provide a manual by-pass means which will electrically connect the line terminals to their respective load terminals.

Figure 2:
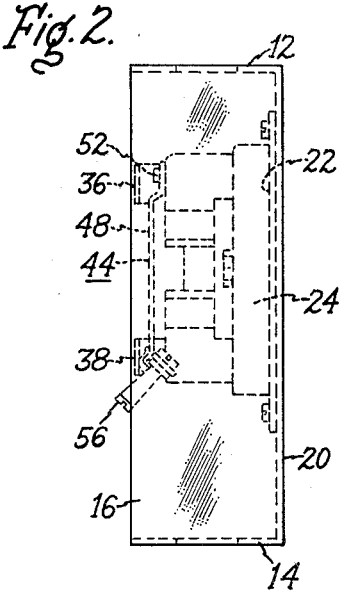
FIGURE 2 is a side view of the meter socket of FIG. 1, showing the by-pass of this invention in position to electrically connect the line and load terminals together.

In order to provide this desired manual by-pass, the manual by-pass means of this invention is provided, being indicated in FIG. 1 as the manual by-pass 44 for the terminals 28, 30 and being indicated at 46 for the terminals 32, 34. The manual by-pass is shown in FIG. 1 in the form of a shorting bar or link 48, 50, respectively. One end of shorting bar or link 48 is electrically and mechanically connected to terminal 28 by bolt 52, while one end of the shorting link 50 is mechanically and electrically connected to the terminal 32 by means of bolt 54. The opposite end of each of the shorting links 48, 50 is mechanically connected to the terminals 30, 34, respectively, by means of a screw member 56, 58, respectively. Each of the screw members 56 and 58 is connected to a plate member 60, 62, respectively, which is mechanically and electrically connected to the terminals 30, 34, respectively, by bolt members 64, 66, respectively.

Figure 3:
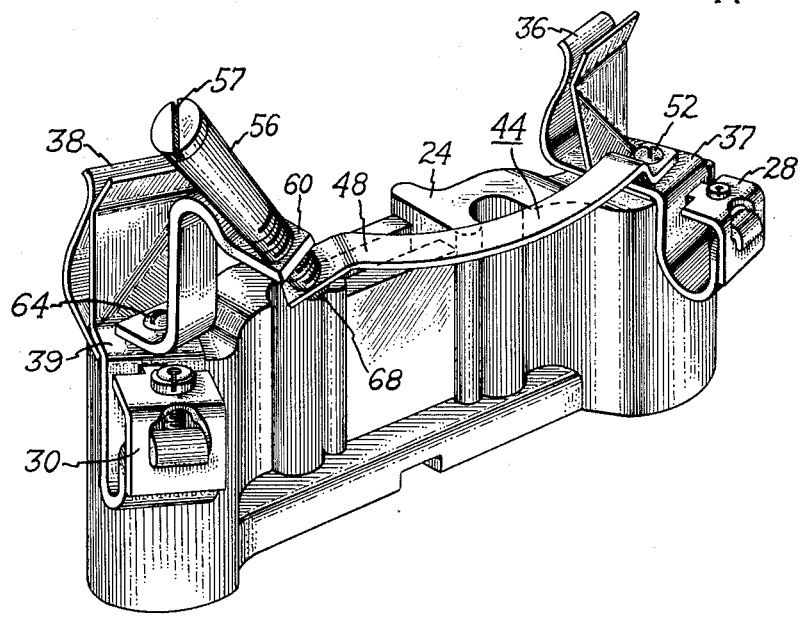
FIGURE 3 is a perspective view of a terminal block of a meter socket showing the preferred embodiment of the manual by-pass of this invention.

Referring now specifically to FIG. 3 for a more detailed description of the manual by-pass of this invention, there is shown in FIG. 3 a terminal mounting block, for example terminal block 24, which as earlier discussed may be mounted directly on the back wall 20 of the meter socket 10 or which may be mounted on the mounting plate 22. While the description hereafter is only of a single by-pass means between one line terminal and one load terminal, it will be understood that the other by-pass means for meter socket 10 is constructed and operates in the same manner. As is well understood, the meter mounting terminal block 24 is made of an insulating material, and is provided on each end thereof with a line terminal and a load terminal, being indicated at 28 and 30. The line terminal 28 and the load terminal 30 are connected electrically to a jaw terminal 36 and 38, respectively. Thus it will be understood that when a line lead is connected within the line terminal 28 the electrical energy of the line lead is automatically conducted to the line jaw terminal 36 through the metal strap 37, which may form a portion of both the line terminal 28 and the jaw terminal 36. In a similar manner, when a load lead is connected into the load terminal 30 the electrical energy of the jaw terminal 38 will automatically be fed to the load terminal 30 by means of the metal strap 39, which may form a part of both the load terminal 30 and the jaw terminal 38. In the preferred embodiment, the line terminals and load terminals are formed of a "one piece" construction, in the manner set forth in patent application Serial No. 135,215, filed August 31, 1961, in the name of J. H. Spencer et al. and assigned to the same assignee as this invention. Of course it will be understood that any other form of terminal could be used, if desired.

When desired to provide a by-pass means to electrically connect the line terminal 28 to the load terminal 30, the manual by-pass 44 of this invention may be utilized. As shown specifically in FIG. 3, the manual by-pass 44 comprises a shorting link 48 made of a conducting material. The shorting link 48 is electrically connected to the line terminal 28 and the jaw terminal 36 by means of the bolt 52 which mechanically and electrically connects one end of shorting link 48 to the metal strap 37, which, as shown, may form a part of both the line terminal 28 and the jaw terminal 36. The opposite end of the shorting link 48 is mechanically connected to the load terminal 30 by means of the screw member 56, provided with screw driver slot 57 at its upper end, which is threaded into a plate member 60. The plate member 60 is of conducting material and is mechanically and electrically connected to the metal strap 39 by the bolt member 64. The screw member 56 is made of an electrically insulating material and is connected to one end of the shorting link 48, as indicated at 68. This is more clearly shown in FIG. 4 of the drawing where the connection and operation of the shorting link and the screw member 56 can be more easily seen.

Figure 4:
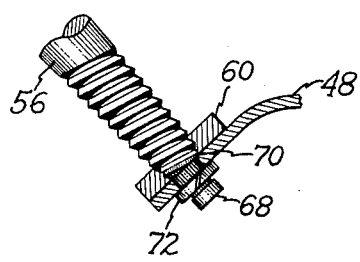
FIGURE 4 is a partial plan view showing in detail the mechanical connection between one terminal and the shorting link, with the link being in electrical contact with the terminal.

As shown in FIG. 4 of the drawing, the screw member 56 is threaded into the plate member 60, and one end of the shorting link 48 is securely fastened to the screw member 56 by means of the shoulder 70 formed by the lower threaded end of the screw member 56, which contacts the top of one end of the shorting link 48. As shown, the lower end of screw member 56 is provided with the raised boss 68, and a split ring 72 is secured about the lower end of bolt member 56 between the boss 68 and the end of the shorting link 48. In this manner, the shorting link 48 is firmly secured to the bolt member 56, between shoulder 70 and ring 72, and moves into and out of contact with plate member 60 when threaded member 56 is threaded in and out of the plate member 60.

From the above description of FIGS. 3 and 4 the operation of manual by-pass 44 will be readily apparent. Of course, it will be understood that the manual by-pass member 46 is constructed in an identical manner with the manual by-pass 44 hereinbefore described. As will be readily apparent from the above description, the shorting link 48 is in electrical and mechanical contact with the line terminal 28 by means of the metallic strap 37 and bolt member 52. The opposite end of the shorting link 48 is in mechanical contact with the load terminal 30 by means of screw member 56, plate member 60, and bolt member 64. As will be understood, by threading the bolt member 56 further into the plate member 60 the end of the shorting link 48 is removed further from plate member 60, thereby maintaining the parts in non-electrical contact, such that the by-pass member is maintained in open circuit condition. However, when it is desired to close the manual by-pass 44 then the bolt member 56 is rotated in an opposite direction to thread bolt member 56 out from plate member 60. In this manner, the opposite end of the shorting link 48 is brought into electrical contact with plate member 60, thereby making substantial electrical contact with the load terminal 30. In this manner, it can be seen that the line terminal and the load terminal are electrically connected through the shorting link 48.

It is desirable that a positive indication be provided when the by-pass means are in shorted position within a meter socket or the like. With this invention, when the line terminals are connected to the load terminals by means of the by-pass 44 and 46, such positive indication is provided. When the screw means 56 and 58 are threaded out from the plate members 60, 62, the top of the screw means extends above the side walls 16 and 18 of the meter socket 10, in the manner shown in FIG. 2. With the screw means 56, 58 in their raised positions, that is when the line terminals are shorted to the load terminals, by the shorting links 48, 50, it is not possible to replace the meter box cover (not shown) on the meter box 10. However, when the screw means 56 and 58 are threaded into the plates 60, 62, respectively, electrically disengaging shorting links 48 and 50 from the load terminals, the top of the screw members are below the side walls 16 and 18, allowing the cover (not shown) to be placed on the socket 10.

Of course, it will be apparent from the above description that the manual by-pass 44 may be readily assembled on to the terminal block 24 within a meter socket, either in the field or in the factory, as desired. As will be well understood, the bolts 52 and 64 are utilized in conjunction with the terminal block 24 to maintain the line terminal 28 and jaw terminal 36 to one side of the terminal block, and load terminal 30 and jaw terminal 38 to the other side of the terminal block. In order to connect the manual by-pass 44 of this invention to the terminal block 24 it is only necessary to remove the bolts 52, and 64, place by-pass 44 in position, and return bolts 52 and 64 to their position on the terminal block. Bolt 52 will secure shorting link 48 to the one end of the terminal block, while the screw member 56 and plate 60 are secured to the other end of the terminal block by bolt 64, in the manner shown. Thus it can be seen that by means of the manual by-pass of this invention, a simple, inexpensive and easily operated manual by-pass is provided for meter sockets. Further, it will be apparent that the manual by-pass may be readily installed in present day meter sockets in the field, and may also be readily installed in meter sockets in the factory, as described. Further, it will be apparent that the manual by-pass of this invention is completely self-contained within the meter socket and may be readily operated by means of a standard screw driver without the need of any special tools, jumpers, or the like. From the above it can be seen that the manual by-pass of this invention, which has been hereinbefore set forth in a preferred embodiment thereof, fulfills all of the objects and advantages hereinbefore set forth. It will be readily apparent to those skilled in this art that many constructional changes may be made in the details hereinbefore set forth without departing from the spirit and scope of this invention, as it is defined in the appended claims.

What is claimed as new and which it is desired to secure by Letters Patent of the United States is:

1. A manual by-pass for use in meter sockets comprising; a shorting link, means on one end of said shorting link for making mechanical and electrical connection to a terminal, an electrically conductive plate member, means on a portion of said plate member for making mechanical and electrical connection to another terminal, a mechanical connecting member of electrically insulating material, said mechanical connecting member being threaded and having a threaded connection with said conductive plate member, one end of said mechanical connecting member being rotatably connected to the other end of said shorting link whereby as said mechanical connecting member is rotated in one direction said other end of said shorting link is moved into mechanical and electrical contact with said electrically conductive plate member and when said mechanical connecting member is rotated in the opposite direction said other end of said shorting link is moved away from said electrically conductive plate member.

2. A manual by-pass meter socket comprising, an open box-like structure comprising a back wall and side walls, line terminals and load terminals attached to said back wall and insulated therefrom, by-pass means attached to said terminals, each said by-pass means comprising a shorting link, one end of each said shorting link being electrically and mechanically secured to one of said line terminals, mechanical connecting means mechanically and electrically secured to each of said load terminals, insulating means mechanically connecting the other end of each said shorting links to one of said mechanical connecting means, said insulating means being movable to move said other end of each shorting links into and out of mechanical and electrical contact with one of said mechanical connecting means.

3. A manual by-pass means for use in meter sockets and the like comprising a shorting link, means on one end of said shorting link for making electrical and mechanical contact with a terminal, a plate member, means on a portion of said plate member for making electrical and mechanical contact with another terminal, an insulated mechanical connection between said plate member and the other end of said shorting link, said mechanical connection comprising means to move said other end of said shorting link into and out of mechanical and electrical contact with said plate member.

References Cited in the file of this patent

UNITED STATES PATENTS

| | | |
|---|---|---|
| 2,782,387 | Coleman | Feb. 19, 1957 |
| 2,825,879 | Moore | Mar. 4, 1958 |
| 2,982,828 | Foskett | May 2, 1961 |